Patented Feb. 14, 1950

2,497,074

UNITED STATES PATENT OFFICE 2,497,074

MODIFIED UREA-FORMALDEHYDE RESINS AND METHODS OF PREPARING THE SAME

James R. Dudley, Darien, and John A. Anthes, Springdale, Conn., assignors to American Cyanamid Company, New York, N. Y., a corporation of Maine No Drawing. Application March 5, 1947, Serial No. 732,659

17 Claims. (Cl. 260—29.4)

This invention relates to modified urea-formaldehyde resins and to methods of preparing the same. More particularly the invention is concerned with resinous compositions comprising a urea-formaldehyde resin having intercondensed therein a water-soluble product of reaction of (1) dicyandiamide with (2) the product of reaction, under acid conditions, of formaldehyde and an amine selected from the class consisting of primary aromatic monoamines and secondary monoamines having at least one monovalent aromatic radical, that is, at least one aryl radical, attached to the amine nitrogen atom, each aryl radical of the said primary and secondary monoamines having at least two of its ortho and para positions unsubstituted. In preparing the water-soluble reaction products the formaldehyde and the monoamine are employed in the ratio of from about 0.5 to about 1.5 mols of formaldehyde per mol of the amine, while the dicyandiamide is employed in an amount corresponding to at least about 0.9 mol thereof per mol of the monoamine used in forming the reaction product thereof with formaldehyde. The water-soluble reaction products which are employed in forming the new modified urea-formaldehyde resins of the present invention are more fully described and are specifically claimed in our copending application Serial No. 732,658, filed concurrently herewith.

The liquid, thermosetting, cationic, resinous compositions of this invention have various uses in the coating, impregnating and other arts, but are especially suitable for use in treating the fibers of paper to improve the properties of the paper, e. g., its wet-strength characteristics, as more fully described and specifically claimed in our copending application Serial No. 732,660, filed concurrently herewith. For such applications the preferred resin is one wherein the water-soluble reaction product is employed in an amount corresponding to from about 2 to about 30%, more particularly from about 6 to about 15%, by weight of the urea component of the urea-formaldehyde resin.

It has been known for some time that the wet tensile strength and the bursting strength of paper can be increased by soaking the formed paper in strong solutions of urea-formaldehyde resin, followed by heating the paper to evaporate the water and to cure the resin to a water-insoluble condition. In some paper mills the urea-formaldehyde resin solution has been applied by spraying the solution onto a moving web of paper, followed by passing the paper over or between heated drying rolls. However, experience has shown that the impregnation of a formed sheet of paper with a resin solution, followed by curing the resin in situ, causes brittleness of the paper with a corresponding reduction of its folding endurance. Moreover, the evaporation of the additional water introduced with the resin requires a second heating of the paper if it has first been dried or, if the paper has been impregnated while still wet, a material reduction in the speed of the drying drums. Despite these objections, however, the so-called "tub" treatment of preformed paper with relatively concentrated aqueous solutions of synthetic resin is still used in some paper mills for special purposes. The modified urea-formaldehyde resins of the present invention may be applied to preformed paper by this method if so desired.

In order to avoid the difficulties inherent in the tub treatment of paper, more recent practice in most paper mills that manufacture wet-strength paper has been to utilize a special type of a melamine-aldehyde resin commonly known as colloidal, cationic melamine-aldehyde resin. This type of resin possesses substantive properties for paper stock, and can be applied to dilute suspensions of paper pulp in small quantities with a high degree of retention and excellent wet strength in the finished paper. The details of this method of producing wet-strength paper are described in an article published in the August 9, 1945 issue of the Paper Trade Journal. Briefly, melamine-formaldehyde resin is dissolved in a water solution of hydrochloric acid or another strong acid other than sulfuric acid to form a solution containing about 0.8 mol of acid for each mol of melamine. The solution is aged, whereby the cure of the resin is advanced and a blue haze develops, indicating the presence of resin particles in the colloidal range. This colloidal solution is added to the water suspension of paper stock in the beater, stock chest, Jordan engine, head box or at any other suitable point ahead of the papermaking wire or screen. The stock is then formed into paper by the usual procedure and carried over steam-heated drying rolls which dry the paper and cure the resin to a water-insoluble condition.

In the copending application of John H. Daniel, Jr., Chester G. Landes and Tzeng Jieuq Suen, Serial No. 732,648, filed concurrently herewith, is disclosed and broadly claimed a method of producing wet-strength paper by treating the fibers of the paper with a cationic urea-formaldehyde resin which cures upon heating to a water-insoluble condition, more particularly a partially polymerized, hydrophilic, cationic urea-formaldehyde-polyfunctional organic nitrogen base resin in which the polyfunctional organic nitrogen base is employed in an amount corresponding to from about 2 to about 30% by weight of the urea component of the resin. Such cationic, thermosetting, modified urea-formaldehyde resins can be applied to the water suspension of hydrated paper stock in the beater, stock chest, head box or at any other suitable point ahead of the paper-forming step as is now done with the colloidal, cationic, melamine-aldehyde resin described in the preceding paragraph. Certain practical advantages are obtained by utilizing a cationic urea-formaldehyde resin instead of a cationic melamine-formaldehyde resin in treating fibers of paper to increase the wet strength of the paper, notably the problem of broke recovery is greatly simplified when the former is used. Moreover, urea-formaldehyde resins are at present considerably cheaper than are the melamine-formaldehyde resins. Hence the production of a satisfactory modified urea-formaldehyde resin having cationic properties offers a feasible means of producing wet-strength paper by the so-called beater addition process at a reduced raw material cost and, therefore, at a lower cost per unit of the treated power.

It is an object of the present invention to provide a new class of modified urea-formaldehyde resins.

Another object of the invention is to provide cationic, heat-curable (thermosetting), modified urea-formaldehyde resins which are especially adapted for treating the fibers of papers to increase the wet-strength characteristics of the paper.

Another object of the invention is to provide methods for making a new class of modified urea-formaldehyde resins.

Other objects of the invention will be apparent to those skilled in the art from the following description.

We have found that the above and other objects are accomplished as broadly described in the first paragraph of this specification and more specifically hereafter. Our new resins are substantive to fibers of cellulosic material such as paper pulp in aqueous suspension; that is, the resin is selectively adsorbed or absorbed by the cellulose fibers from a dilute aqueous solution or dispersion thereof containing these fibers in an amount much greater than that corresponding to the concentration of resin in the solution or to what would be contained in the water normally left in the sheet after forming. This was quite surprising and unexpected and in no way could have been predicted from the known properties of urea-formaldehyde resins or from the known properties of the reactants used in preparing the new water-soluble reaction products which we intercondense into a urea-foraldehyde resin to produce the new and useful modified urea-formaldehyde resins of the present invention. Because our new resins are substantive to fibrous cellulosic materials, e. g., paper pulp, it makes possible the application to such fibers, while the fibers are in dilute aqueous suspensions of the consistency used in paper mills, of the amount of resin required to provide a paper of high wet-strength characteristics.

The resins of our invention are prepared by effecting reaction, more particularly under acid conditions, and preferably at a pH below about 4.5, between (1) a product of partial reaction, preferably under non-acidic conditions, that is, under neutral or alkaline (preferably slightly alkaline) conditions, between urea and formaldehyde, and (2) a water-soluble reaction product of the kind broadly described in the first paragraph of this specification and more fully hereafter and in our aforementioned copending application Serial No. 732,658. Such water-soluble reaction products, which are sometimes referred to herein for purpose of brevity as "polyarylbiguanides," are preferably prepared by effecting reaction under acid conditions between (1) dicyandiamide and (2) the product of reaction, under acid conditions, of formaldehyde (including compounds engendering formaldehyde) and either a primary aromatic monoamine, e. g., aniline, or a secondary monoamine having at least one aromatic radical attached to the amine nitrogen atom, e. g., N-methylaniline. In preparing the reaction product of (2) the formaldehyde and the amine are employed in the ratio of from about 0.5 to about 1.5 mols, more particularly from about 0.6 to about 1.3 mols, of the former per mol of the latter. The dicyandiamide is used in an amount corresponding to at least about 0.9 mol thereof, more particularly from about 1 to about 1.3 mols thereof, for each mol of the amine used in forming the reaction product of (2).

The water-soluble reaction product or polyarylbiguanide is caused to react or condense with a urea-formaldehyde partial reaction product, e. g., dimethylol urea or thiourea or similar primary or substantially monomeric urea-formaldehyde reaction or condensation product obtained by effecting reaction or condensation under neutral conditions or, preferably, under slightly alkaline conditions between formaldehyde and a urea reactive therewith, e. g., urea itself, thiourea, etc. In preparing the cationic, modified urea-formaldehyde resins of this invention, the reaction between the cationic additive or polyarylbiguanide and the urea-formaldehyde partial reaction product is effected under acid conditions, sufficient acid being added to the mixture of reactants, if the pH of the mixture is not initially sufficiently low, to reduce the pH (measured after the reaction has proceeded for some time) to below about 4.5, e. g., about 1.0 to 4.0, and preferably about 1.0 to 2.0 or 2.5. The cationic, modified urea-formaldehyde resins thereby produced are substantive towards paper stock and are especially adapted for treating such stock to improve its wet-strength characteristics as more fully described and specifically claimed in our aforementioned copending application Serial No. 732,660.

*Preparation of cationic additive*

The cationic additive or polyarylbiguanide is prepared by effecting reaction under acid conditions between formaldehyde or a compound engendering or yielding formaldehyde, e. g., paraformaldehyde, trioxane, etc., and a primary aromatic (aromatic hydrocarbon) monoamine or a secondary monoamine having at least one aromatic (aromatic hydrocarbon) radical attached to the amine nitrogen atom. In all cases the amine employed has at least two unsubstituted positions which are ortho or para to the amino group. Illustrative examples of amines that may be used are aniline, N-methylaniline, N-ethylaniline, N-propylaniline, N-isopropylaniline, N-n-butylaniline, N-isobutylaniline, N-sec.-butylaniline, N-allylaniline, o-, m-, and p-toluidines, o-aminodiphenyl, α-naphthylamine, β-naphthylamine, 2,3-xylidine, 3,4-xylidine, 3,5-xylidine, etc.

The reaction between the formaldehyde and the monoamine may be effected at various temperatures ranging, for example, from 40° or 50° C. up to the reflux or boiling temperature of a solution, more particularly an aqueous solution, of the reactants. The time of reaction will vary depending, for instance, upon the particular reactants and proportions thereof employed, the kind of acid used, the pH of the reaction mixture, the temperature employed, etc. When other influencing factors are the same, the time of reaction is longer at the lower temperatures than at the higher temperatures. In order to avoid or lessen the possibility of precipitation, the formaldehyde preferably is added slowly to the monoamine dissolved in an aqueous solution of the acid employed, that is, to an aqueous solution of the monoamine salt. Ordinarily the desired degree of reaction is obtained by heating an acidified aqueous solution of the monoamine under reflux at the boiling temperature of the mass, while slowly adding an aqueous solution of formaldehyde thereto, over a period of from about ¼ to about 2½ hours. In some cases the aqueous formaldehyde may be added rapidly to the acidified solution of the monoamine and the resulting mixture heated under reflux until any precipitate which forms has redissolved.

The molar proportions of formaldehyde and monoamine are important. If substantially less than about 0.5 mol of formaldehyde per mol of monoamine be employed, the resulting reaction product is too low in molecular weight to provide, upon reaction with dicyandiamide, a satisfactory cationic modifier of urea-formaldehyde resin. If more than about 1.5 mols of formaldehyde per mol of monoamine be used, the product gels and, upon reaction with dicyandiamide, yields a product which, depending upon the amount of formaldehyde employed, either is not water-soluble or does not form a stable aqueous solution. We prefer to use the formaldehyde and the monoamine in the ratio of from about 0.6 to about 1.3 mols of the former per mol of the latter, e. g., from 0.7 to 1.2 mols of formaldehyde per mol of the monoamine, e. g., aniline, N-methylaniline, etc. With aniline and an N-lower alkyl aniline, more particularly N-methylaniline, optimum results have been obtained using about 0.75 mol of an aqueous solution of formaldehyde per mol of aniline or N-methylaniline. With such a cationic additive a modified urea-formaldehyde liquid resin having optimum water solubility can be produced.

The reaction between the formaldehyde and the monoamine is effected under acid conditions, usual strongly acid conditions, e. g., at a pH between 0.5 and 4. Ordinarily the reaction is effected under heat at a pH not substantially exceeding about 3, more particularly at a pH of 2 or less, e. g., from 0.5 to 2.

Any suitable organic or inorganic acid may be used in obtaining the desired acid conditions for effecting reaction between the formaldehyde and the monoamine. Illustrative examples of acids that may be employed are the inorganic acids, e. g., hydrochloric, hydrobromic, sulfuric, phosphoric, etc., and the organic acids, e. g., formic, acetic, oxalic, tartaric, malic, citric, lactic, benzoic, etc. We prefer to use a strong mineral acid such, for example, as hydrochloric acid.

The amount of dicyandiamide which is reacted with the monoamine-formaldehyde reaction or condensation product is important in so far as the minimum amount thereof is concerned. The dicyandiamide should be employed in an amount corresponding to at least about 0.9 mol thereof for each mol of the monoamine used in forming the amine-formaldehyde reaction product. No particular advantage ordinarily accruses from using more than about 1.2 mols of dicyandiamide per mol of the monoamine reactant, although more may be used if desired, for example, 1.5 or more mols of dicyandiamide for each mol of the monoamine employed. When the dicyandiamide is used in an amount above about 1 mol thereof per mol of the monoamine, the excess dicyandiamide above 1 mol is merely present in the final product as unreacted dicyandiamide or as a hydrolysis product thereof. We prefer to use the dicyandiamide in a molar amount approximately equal to the molar amount of monoamine employed or to use a slight molar excess of dicyandiamide, e. g., from 1.05 to 1.15 mols of dicyandiamide per mol of the monoamine employed in forming the amine-formaldehyde reaction product.

The reaction between the dicyandiamide and the amine-formaldehyde reaction product is preferably effected or at least initiated under acid conditions. The acidity of the amine-formaldehyde reaction product or aqueous solution thereof may be adjusted as desired or as may be required prior to the addition of the dicyandiamine. For example, if the pH of the aqueous amine-formaldehyde reaction product is less than 2, it may be increased by adding a suitable alkaline substance (that is, a substance which gives an alkaline reaction in water) thereto, for instance, a hydroxide or carbonate of an alkali metal (e. g., sodium or potassium hydroxide or carbonate), calcium hydroxide, barium hydroxide, etc. In this way the pH may be increased to, for example, 3 or 4 or more prior to adding the dicyandiamide. As the reaction between the dicyandiamide and amine-formaldehyde reaction product proceeds, the pH of the reaction mass ordinarily increases. Thus, depending upon the pH of the aqueous reaction product prior to adding the dicyandiamide, it may increase (depending upon the conditions of reaction including the amount of dicyandiamide employed) to from about 4.5 to about 6.5 toward the end of the reaction period. We prefer that the pH of the final product, especially when it is to be used as a cationic modifier of a urea-formaldehyde resin, be acid at the end of the reaction period, e. g., a pH of 4.5 to 6.

The amine-formaldehyde reaction product may be diluted with additional water, if desired, prior to adding the dicyandiamide thereto.

The dicyandiamide and amine-formaldehyde reaction product are caused to react at a suitable temperature, for instance, under temperature conditions such as above described with reference to the production of the amine-formaldehyde reaction product. The time of reaction may vary considerably, the end of the reaction ordinarily being indicated by a substantial change in the color of the original reaction mass. Generally the reaction is completed by heating the reaction mass under reflux at boiling temperature for a period of the order of ¾ to 3½ or 4 hours, more particularly for about 1 to 3 hours.

The final aqueous solution of the water-soluble resinous or polymeric reaction product may be diluted or concentrated to obtain a liquid resinous composition of a particular viscosity or a particular concentration of solids. If desired, the product may be substantially completely dehydrated, for example, by heating, preferably under reduced pressure, to obtain a solid, water-soluble, non-crystalline or resinous reaction product. If desired, the reaction product may be precipitated as the free base by adding an aqueous solution of an alkali-metal hydroxide (e. g., sodium hydroxide) thereto, which product then is filtered off and dried. The dried product may be redissolved in an aqueous acid solution. The water-soluble reaction product is essentially polymeric in structure. When aniline is the amine employed in the preparation of the amine-formaldehyde reaction product, the polymer (linear polymer) is believed to correspond substantially to the formula

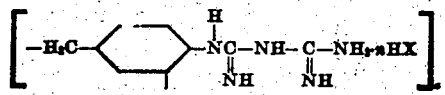

where $nHX$ represents the acid and amount thereof which is combined in the form of a salt with the reaction product of (1) dicyandiamide with (2) the amine-formaldehyde reaction product and $x$ represents a number which is at least 2 and may be as high as 20 or 30 or more.

In order that those skilled in the art better may understand how the present invention may be carried into effect the following examples are given by way of illustration and not by way of limitation. All parts are by weight.

*Example 1*

|  | Parts | Approx. Molar Ratio |
|---|---|---|
| Analine | 93 | 1.0 |
| Concentrated hydrochloric acid (approx. 38% HCl) | 120 | 1.25 |
| Aqueous formaldehyde (approx. 37% HCHO) | 60 | 0.75 |
| Dicyandiamide | 84 | 1.0 |
| Water | 100 | |

The aniline, hydrochloric acid and water were mixed in a reaction vessel provided with a stirrer and a reflux condenser, and the mixture was heated to boiling. The aqueous formaldehyde was added slowly to the stirred, refluxing mixture over a period of ½ hour. A bright red color developed. Refluxing was continued for an additional hour, after which 7 parts of solid sodium hydroxide was added, thereby increasing the pH of the reaction mass to 3.5. The above-stated amount of dicyandiamide was then added all at once, and the resulting mixture was heated with stirring under reflux at the boiling temperature of the mass for 1½ hours, yielding an orange-colored solution of the reaction product in a yield amounting to 451 parts. Dilution of this solution with water to 465 parts yielded a product having a pH of approximately 5.5 and having a solids content (calculated as free base) of about 40%.

*Example 2*

Same as Example 1 with the exception that 72 parts instead of 60 parts of aqueous formaldehyde was employed. The resulting solution was darker colored than the product of Example 1 and, on cooling, a second phase separated. The separated phase redissolved upon adding 2.38 parts of concentrated hydrochloric acid to the reaction mass.

*Example 3*

|  | Parts | Approx. Molar Ratio |
|---|---|---|
| Aniline | 93 | 1.0 |
| Concentrated hydrochloric acid (approx. 38% HCl) | 120 | 1.25 |
| Aqueous formaldehyde (approx. 37% HCHO) | 72 | 0.9 |
| Dicyandiamide | 92 | 1.1 |
| Water | 100 | |

The aqueous formaldehyde was added rapidly to the stirred mixture of aniline and hydrochloric acid (solution of aniline hydrochloride), yielding a thick, yellow slurry which was heated to boiling with stirring. After heating for about 30 minutes a clear, bright red solution was obtained. The above-stated amount of dicyandiamide was then added all at once, and the resulting mixture was stirred and refluxed for 1½ hours, yielding an orange-colored solution of the reaction product.

*Example 4*

The same formula as in Example 3 with the exception that in this case 81 parts of 37% aqueous formaldehyde was employed. The aqueous formaldehyde was added slowly over a period of 20 minutes to the refluxing aniline hydrochloride solution. Thereafter 6 parts of solid sodium hydroxide was added in order partly to neutralize the excess hydrochloric acid. The dicyandiamide was added all at once, and the resulting mixture was heated with stirring under reflux at the boiling temperature of the mass for 2 hours, yielding a solution of the reaction product which was somewhat lighter in color than any of the products of the prior examples.

*Example 5*

|  | Parts | Approx. Molar Ratio |
|---|---|---|
| Aniline | 93 | 1.0 |
| Concentrated hydrochloric acid (approx. 38% HCl) | 108 | 1.125 |
| Aqueous formaldehyde (approx. 37% HCHO) | 117 | 1.45 |
| Dicyandiamide | 92 | 1.1 |
| Water | 100 | |

The same general procedure was followed as described under Example 1 with the exception that the excess hydrochloric acid was not neutralized. The addition of formaldehyde was continued until particles of gel began to form around the point of addition, the amount added being 117 parts. After adding the dicyandiamide, the stirred reaction mixture was heated under reflux for 3 hours, yielding an orange-colored solution of the reaction product with a pH of 5.

Example 6

|  | Parts | Approx. Molar Ratio |
|---|---|---|
| Aniline | 186 | 1.0 |
| Concentrated hydrochloric acid (approx. 38% HCl) | 211 | 1.1 |
| Aqueous formaldehyde (approx. 37% HCHO) | 121 | 0.75 |
| Dicyandiamide | 176 | 1.05 |

The concentrated hydrochloric acid was added to the aniline and the resulting solution was heated with stirring under reflux to boiling. The aqueous formaldehyde was added slowly to the stirred, refluxing solution over a period of 1½ hours. The dicyandiamide was then added all at once, and refluxing and stirring were continued for 1½ hours, yielding a light orange-colored solution of the reaction product. Sufficient water was added to this solution to provide a solution containing 50% of solids (calculated as the free base) and having a pH of 5.0. The solution of this example was lighter in color than the products of any of the prior examples.

Example 7

|  | Parts | Approx. Molar Ratio |
|---|---|---|
| N-methylaniline | 107 | 1.0 |
| Concentrated hydrochloric acid (approx. 38% (HCl) | 106 | 1.1 |
| Aqueous formaldehyde (approx. 37% HCHO) | 60 | 0.75 |
| Dicyandiamide | 92 | 1.1 |

The N-methylaniline was dissolved in the concentrated hydrochloric acid, and the resulting solution of N-methylaniline hydrochloride was heated with stirring under reflux to boiling. The aqueous formaldehyde was added slowly to the stirred, refluxing solution over a period of 1 hour, yielding an orange-colored solution of the N-methylaniline-formaldehyde reaction product. The solution was diluted with water to 40% of solids (calculated as the free base). The dicyandiamide was added all at once to the diluted solution, after which the mixture was heated with stirring under reflux at the boiling temperature of the mass for 2 hours. The color of the solution became lighter and its viscosity increased toward the end of the reaction period.

The solid, water-soluble product of the reaction, which is in solution in the water, is essentially polymeric in structure. The polymer (linear polymer) is believed to correspond substantially to the formula

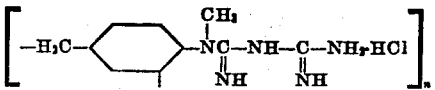

where $n$ represents a number which is at least 2 and may be as high as 20 or 30 or more.

Sufficient water was added to the solution prepared as above described to provide a solution containing 50% of solids calculated as the free base.

Preparation of polyarylbiguanide-modified urea-formaldehyde resin

Our new modified urea-formaldehyde resins are preferably prepared by first reacting a reactive urea, specifically urea itself, with an active methylene-containing or -yielding substance, e. g., formaldehyde, paraformaldehyde, trioxane, etc., in known manner to form a primary urea-formaldehyde reaction or condensation product, which is usually designated by resin chemists as dimethylol urea and which, regardless of the specific name by which it is designated, is a partial reaction product of urea and formaldehyde. This partial reaction product is preferably formed under neutral or slightly alkaline conditions, the latter being obtained by the addition of a small amount of a basic material, that is, a material which gives an alkaline reaction in an aqueous solution, for instance, an alkali-metal hydroxide or carbonate (e. g., sodium or potassium hydroxide or carbonate, etc.), an amine, preferably a tertiary amine, e. g., trimethylamine, triethylamine, triethanolamine, etc. A suitable quantity of the polyarylbiguanide is then added, and the resin solution is acidified by the addition of an acid substance, that is, a substance which gives an acid reaction in an aqueous solution, preferably a strong acid, e. g., hydrochloric acid, hydrobromic acid, nitric acid, phosphoric acid or other strongly acidic material, thereby to reduce the pH of the reaction mass to the desired point, that is, to a pH below about 4.5, e. g., from about 1.0 to 4.0, and preferably 1.0 to 2.0 or 2.5. The reaction between the polyarylbiguanide and the urea-formaldehyde partial reaction product is then caused to proceed under heat, e. g., at temperatures above 40° C., and preferably at elevated temperatures of the order of 70° to 90° C., thereby resulting in intercondensation between the reactants.

It is an important feature of the cationic, modified urea-formaldehyde resins of our invention that only relatively small proportions of the polyarylbiguanide need be used to impart the desired cationic properties to the final resin. The importance of using only a relatively small quantity of the polyarylbiguanide in such resins is one which not only involves cost factors but also the practical usefulness of the resins, since relatively large quantities have a tendency to solubilize the cured resin and thus prevent the formation of a water-insoluble bond between the fibrils of the paper. In general, resins containing a larger quantity of polyarylbiguanide than of urea on a weight basis possess little or no ability to impart wet-strength characteristics to paper, but may be satisfactory for other applications of the resin. Resins containing a smaller quantity of polyarylbiguanide than of urea, on the other hand, will impart wet strength to the paper, the wet tensile strength ordinarily increasing steadily as the ratio of polyarylbiguanide is decreased to the point where the resin syrup becomes hydrophobic in character and precipitates upon dilution with water. Accordingly, the preferred resins of our invention are those in which the polyarylbiguanide is employed in an amount corresponding to from about 2 to about 30%, more particularly about 6 to about 15%, by weight of the urea component of the urea-formaldehyde resin. Optimum results have been obtained when the polyarylbiguanide constituted about 8 to about 12%, and specifically approximately 10%, by weight of the urea used in making the cationic urea-formaldehyde resin.

In the application of the resins of this invention to paper stock for increasing its wet-strength characteristics, the degree of reaction or polymerization of the resin is important, but is less important in other applications of the resin, e. g., in laminating and adhesive applications. Tests have shown that much greater wet strength of paper is obtained when the resin is polymerized or advanced in cure to a stage wherein a definite increase in its viscosity has been obtained, e. g., when the reaction has continued until the water-soluble thermosetting resin has so advanced in cure that a 35-40% (more particularly approximately 38%), by weight, aqueous solution thereof (that is, an aqueous solution containing 35-40% by weight of resin solids) has a viscosity at 25° C. of at least about 100 centipoises. Accordingly, we prefer to continue the reaction or polymerization of the resin, e. g., by holding the acidified syrup within an appropriate temperature range, until a viscosity of the order of 100 centipoises or higher at 25° C. has been obtained. The syrup is then preferably neutralized to a pH of about 6.5 to 7.5, more particularly 6.75 to 7.25, in order to obtain a product which has optimum stability on storage. In this way resin syrups are obtained that are both water-soluble and water-dilutable. Such liquid resins may be evaporated to dryness and redissolved in water without substantial reduction in their water solubility or in their utility for the production of wet-strength paper.

As has been stated, the cationic, modified urea-formaldehyde resins of this invention can be applied to paper or other felted cellulosic products by tub application methods if desired. Thus, for example, preformed and completely or partially dried paper prepared from a chemical pulp such as sulfite, neutral sulfite, rag soda or sulfate, or a mechanical pulp such as ground wood or any mixture thereof may be immersed in a 1% to 10% aqueous solution of the resin and impregnated with about 50 to about 100% by weight thereof, based on the weight of the paper. The paper is then heated for about 1 to 4 minutes at 212° to 300° F. or thereabouts, or for a shorter period of time at higher temperatures, whereby the paper is dried and the resin is cured to a water-insoluble condition. The resulting paper has greatly increased wet strength as compared with the untreated paper. The method is well suited for the impregnation of paper such as is used in the production of paper towels, absorbent tissues and the like, as well as heavier paper stock such as wrapping paper, bag paper, and the like to impart wet-strength characteristics thereto.

The cationic resins of this invention are especially adapted for use in processes wherein the resin in its heat-curable (heat-convertible) and hydrophilic or water-dilutable condition is added to an aqueous suspension of the paper stock, such as any of those mentioned hereinbefore, in the beater, stock chest, Jordan engine, fan pump, head box or at any other suitable point ahead of the papermaking wire or screen, followed by forming the treated fibers into a felted product on the wire or cylinder. The quantity of liquid resin which is added to the aqueous stock suspension will depend on such influencing factors as, for example, the degree of dry and wet strength desired in the finished product, the per cent of resin retained by the paper fibers, etc. Ordinarily, however, the liquid resin in an amount corresponding to about 0.5% to 5% or more by weight of resin solids is added in this manner, although in some cases as little as 0.1% (calculated as resin solids) may be employed and, for special purposes, as much as 8 to 10% (also calculated as resin solids). The aforesaid percentage figures are based on the weight of the dry paper stock. The felted paper is then dried in the usual manner to dry the paper board, thereby curing or converting the resin to a water-insoluble condition and imparting a substantial degree of wet strength to the paper or other product formed of felted cellulosic fibers which has been treated with our new cationic resin. The resin not adsorbed or absorbed by the paper stock may be re-used by employing a circulating white-water system; that is, by using a part or all of the white water from the papermaking machine for preparing further batches of paper-pulp suspension.

The heat-curable resin contained in the paper, whether introduced as a tub size or combined with the cellulosic fibers prior to sheet formation by adsorption or absorption in aqueous suspension, can be cured under neutral or acid conditions by subjecting the paper to heat treatment. However, the fastest cure and the highest wet strength are obtained by curing the resin under slightly acid conditions. Hence, it is preferable to acidify the paper stock before, during or after the resin addition thereto. In most cases this acidification can be advantageously accomplished by the addition of about 1 to 3% by weight of aluminum sulfate (alum), based on the weight of the dry paper stock. Since alum is frequently used for the purpose of fixing rosin or wax sizes in the paper, its use therefore involves no added expense. Under these conditions, the desired wet strength is imparted to the paper by a cure of 1 to 2 minutes at about 230° to about 260° F., or for shorter periods at higher temperatures. The degree of wet strength is frequently increased by longer heating at lower temperatures, e. g., by storing the finished paper from the drier section in rolls, whereby the heat held by the paper is utilized to cure the resin.

In order that those skilled in the art better may understand how the present invention may be carried into effect the following examples of the preparation of modified urea-formaldehyde resins embraced by this invention are given by way of illustration and not by way of limitation. All parts are by weight.

*Example 8*

|  | Parts | Approx. Molar Ratio |
|---|---|---|
| Urea | 60.0 | 1.0 |
| Aqueous solution of formaldehyde (approx. 37% HCHO) | 186.0 | 2.3 |
| 40% aqueous solution of cationic additive of Example 1 | 15.0 |  |
| 50% aqueous solution of triethanolamine | 4.3 |  |

The urea was dissolved in the aqueous formaldehyde containing the aqueous triethanolamine, yielding a solution having a pH of 8.5. This solution was heated to 70° C. for 15 minutes to effect partial reaction between the urea and formaldehyde. Thereafter the solution of the cationic additive was added, followed by 2.38 parts of concentrated hydrochloric acid. The resulting reaction mass had a pH of 2. The temperature rose on adding the acid to 85° C. The solution was stirred at 80°-85° C. until a marked increase in viscosity was apparent (about 5 minutes), then adjusted to a pH of about 6.5-7.0 with a dilute aqueous solution of sodium hydroxide. The color of the liquid resin was very pale yellow.

"Cationic additive" as used in this and other examples has reference to the solid reaction product on a net dry basis.

Example 9

Same as Example 8 with the exception that 202 parts of an approximately 37% aqueous solution of formaldehyde was employed, that is, in the ratio of about 2.5 mols of formaldehyde per mol of urea. The cationic additive was reacted under acid conditions with the urea-formaldehyde partial reaction product for 12 minutes at 80°–85° C. or until the viscosity of the product was about the same as the product of Example 8, and was then adjusted to a pH of about 6.5–7.0 with an aqueous NaOH solution. The liquid resin was more water-soluble than the product of Example 8, being dilutable with water in all proportions. Its color was a very pale yellow.

Example 10

Same as Example 8 with the exception that only 7.5 parts of the 40% aqueous solution of the cationic additive of Example 1 was used. Stirring and heating for only 3 minutes at 80°–85° C. resulted in a liquid resin having approximately the same viscosity as that of the resins of Examples 8 and 9. The resin was adjusted to a pH of about 6.5–7.0 with an aqueous NaOH solution. It was soluble in water in concentrations of less than about 3% and more than about 30% resin solids. It had a barely perceptible yellow color.

Example 11

Same as Example 8 with the exception that 15 parts of a 40% aqueous solution of the cationic additive of Example 2 was used. The liquid resin was a deeper yellow in color than that of the liquid resins of Examples 8, 9 and 10.

Example 12

Same as Example 11 with the exception that 7.5 parts of a 40% aqueous solution of the cationic additive of Example 2 was used. Stirring and heating for only 3 minutes at 80°–85° C. resulted in a liquid resin having approximately the same viscosity as that of the preceding examples. It was soluble in very dilute aqueous solutions. The addition of a small amount of acetone increased the solubility characteristics at concentrations between about 5 and 20%.

Example 13

Same as Example 8 with the exception that 10 parts of a 40% aqueous solution of the cationic additive of Example 4 was used, and the mixture of additive and urea-formaldehyde partial reaction product was stirred at 70° C. until a marked increase in viscosity was noted (about 5 minutes), then adjusted to a pH of about 6.5–7.0 with dilute aqueous NaOH. The liquid resin, which had about the same water solubility as the liquid resin of Example 12, was pale yellow in color.

Example 14

Same as Example 13 with the exception that there were used 7.5 parts of a 40% aqueous solution of the cationic additive of Example 4 and 202 parts of an approximately 37% aqueous solution of formaldehyde, that is, in the ratio of about 2.5 mols of formaldehyde per mol of urea. In this example the reaction period between the cationic additive and the urea-formaldehyde partial reaction product was about 7 minutes at 70° C. The appearance and the water solubility of the liquid resin were about the same as that of the resin of the preceding example.

Example 15

Same as Example 8 with the exception that 15 parts of a 40% aqueous solution of the cationic additive of Example 4 was used. The liquid resin had about the same appearance and water solubility as the resins of Examples 13 and 14.

Example 16

Same as Example 8 with the exception that there were used 30 parts of a 40% aqueous solution of the cationic additive of Example 4 and 194 parts of an approximately 37% aqueous solution of formaldehyde, that is, in the ratio of about 2.4 mols of formaldehyde per mol of urea. The liquid resin was medium yellow in color and was miscible with water in all proportions.

Example 17

Same as Example 13 with the exception that 202 parts instead of 186 parts of aqueous formaldehyde (approx. 37% HCHO) was used, and the mixture of cationic additive and urea-formaldehyde partial reaction product was adjusted to a pH of about 3.0–3.5 instead of the usual 2; also, the reaction mass was stirred and heated for 60 minutes at 70° C. instead of about 5 minutes as in Example 13. The liquid resin was pale yellow in color. It was miscible with water but gave cloudy solutions in concentrations of about 10% by weight of resin.

Example 18

Same as Example 8 with the exception that 12 parts of a 50% aqueous solution of the cationic additive of Example 5 and 202 parts of aqueous formaldehyde (approx. 37% HCHO) were used. The acidified reaction mass was stirred and heated for 10 minutes at 70°–80° C. The addition of a small amount of acetone increased the water solubility of the liquid resin at concentrations of about 10% by weight of resin.

Example 19

Same as Example 18 with the exception that about 162 parts instead of 202 parts of aqueous formaldehyde (approx. 37% HCHO) was used, that is, in the ratio of about 2 mols of formaldehyde per mol of urea. The reaction mass was acidified with dilute HCl to a pH of only 4 instead of 2, as in Examples 8–16 and 18, after adding the cationic additive. After stirring and heating for about 3 minutes at 70°–80° C. a marked increase in the viscosity of the mass occurred, after which it was adjusted to a pH of about 6.5–7 with 10% aqueous NaOH solution. The water solubility of the liquid resin of this example was about the same as the resin of the preceding example with the exception that slightly more acetone was required to keep the resin in solution in concentrations of about 10% by weight of resin. No acetone was necessary when the resin concentration in water was about 1% or less. The liquid resin was light yellow in color and slightly cloudy.

Example 20

Same as Example 18 with the exception that 227 parts instead of 202 parts of aqueous formaldehyde (approx. 37% HCHO) was used, that is, in the ratio of about 2.8 mols of formaldehyde per mol of urea. The reaction mass was acidified with concentrated HCl to a pH of 2 after adding the cationic additive. Reaction between the cationic additive and the urea-formaldehyde partial reaction product was effected by stirring and heating the reaction mass for 45 minutes at 70° C. The resulting liquid resin was allowed to cool to about 50° C. and then was adjusted to a pH of 7.2 by adding a dilute aqueous NaOH solution. It was clear, pale yellow in color and soluble in water in concentrations of less than about 3% and more than about 30% of resin solids. The liquid resin had a calculated concentration of about 33% by weight of resin solids.

Example 21

Same as Example 18 with the exception that 178 parts instead of 202 parts of aqueous formaldehyde (approx. 37% HCHO) was used, that is, in the ratio of about 2.2 mols of formaldehyde per mol of urea, and the acidified urea-formaldehyde partial reaction product was stirred and heated for about 3 minutes at 70°–80° C. It was adjusted to a pH of about 6.5–7.0 by adding a dilute aqueous NaOH solution. The addition of a small amount of acetone improved its water-solubility characteristics in concentrations within the range of about 3 to 30% by weight of resin solids.

Example 22

Same as Example 8 with the exception that there were used 14 parts of a 50% aqueous solution of the cationic additive of Example 6 and 202 parts of aqueous formaldehyde, that is, in the ratio of about 2.5 mols of formaldehyde per mol of urea. The reaction period between the cationic additive and the urea-formaldehyde partial reaction product was about 10 minutes at 70° F. Thereafter the liquid resin was adjusted to a pH of 6.85 by adding dilute aqueous NaOH solution. The liquid resin was dilutable with water in all proportions when first made, but had limited solubility characteristics after standing for about 48 hours.

Example 23

| | Parts | Approx. Molar Ratio |
|---|---|---|
| Urea | 120 | 1.0 |
| Aqueous formaldehyde (approx. 37% HCHO) | 404 | 2.5 |
| 50% aqueous solution of cationic additive of Example 6 | 24 | |

The urea and aqueous formaldehyde were caused to react by heating the mixture thereof, to which had been added sufficient 10% aqueous NaOH solution to impart to the reaction mass a pH of 8.5, for 15 minutes at 70° C. The resulting liquid urea-formaldehyde partial reaction product was acidified with about 6 parts of concentrated hydrochloric acid and the cationic additive then added immediately thereafter. The pH of the reaction mass after adding the cationic additive was 1.5. Samples of approximately 50 parts each were withdrawn at intervals of 1, 3, 5, 7 and 9 minutes after the addition of the acid, the reaction mass being heated during this period at 70°–80° C. Each sample was adjusted to a pH of about 6.5–7, after which their viscosities were determined at 25° C., using an Ostwald viscosimeter. The results were as follows:

| Sample No. | Reaction Period in Minutes | Viscosity in Centipoises at 25° C. |
|---|---|---|
| 23-A | 1 | 50 |
| 23-B | 3 | 93 |
| 23-C | 5 | 134 |
| 23-D | 7 | 173 |
| 23-E | 9 | 200 |

Example 24

Same as Example 23 with the exception that partial reaction between the urea and the formaldehyde was effected at a pH of about 8.5 obtained by adding about 8.6 parts of a 50% aqueous solution of triethanolamine. The cationic additive and about 7.2 parts of concentrated HCl were added. The reaction between the additive and the urea-formaldehyde partial reaction product was effected at a pH of about 1.5–2 by heating for 5 minutes at 70° to 80° C. The resulting liquid resin was adjusted to a pH of about 6.5–7 by adding a dilute aqueous NaOH solution. The viscosity of the resin was 96 centipoises at 25° C.

Example 25

Same as Example 8 with the exception that there were used 12 parts of a 50% aqueous solution of the cationic additive of Example 7 and 202 parts of aqueous formaldehyde (approximately 37% HCHO), that is, in the ratio of about 2.5 mols of formaldehyde per mol of urea. Partial reaction between the urea and formaldehyde was effected at a pH of about 8.5, obtained by adding a 10% aqueous NaOH solution, by heating for 15 minutes at 70°–80° C. The partial reaction product was acidified by adding 2.38 parts of concentrated hydrochloric acid followed by the cationic additive. The pH of the resulting mass was about 2. It was heated for 5 minutes at about 70° C. to effect reaction between the cationic additive and the urea-formaldehyde partial reaction product, after which it was neutralized with dilute aqueous NaOH solution to a pH of about 7.3. The liquid resin was light yellow in color, was miscible with water, and showed no change in appearance after standing for 4 months.

Example 26

Same as Example 25 with the exception that 20 parts of a 50% aqueous solution of the cationic additive of Example 7 was used. Reaction was effected between the urea and formaldehyde, which was adjusted to a pH of about 8.5 with a 10% aqueous NaOH solution, by heating the mixed reactants for 10 minutes at 80° C. After heating the mixture of the cationic additive and the urea-formaldehyde partial reaction product for 5 minutes at about 70° C., the resulting liquid resin was adjusted to a pH of 6.5–7 with 10% aqueous NaOH solution. The liquid resin was light yellow in color and miscible with water in all proportions.

Example 27

Same as Example 26 with the exception that there were used 12 parts of a 50% aqueous solution of the cationic additive of Example 6 and 203.5 parts of aqueous formaldehyde (approximately 37% HCHO). The urea-formaldehyde partial reaction product was acidified with hydrochloric acid to a pH of 2, after which the cationic additive was added and the reaction mass was heated at 70° C. for 2½ minutes. The resulting liquid resin was adjusted to a pH of about 6.5–7 with 10% aqueous NaOH solution. It was dilutable with water in all proportions both as initially prepared and after standing for 24 hours. An aqueous solution of the resin containing about 35% by weight of resin solids had a viscosity of about 200 centipoises at 25° C.

Example 28

Same as Example 27 with the exception that to the urea-formaldehyde partial reaction product there were added 4.3 parts of triethanolamine and sufficient hydrochloric acid to bring the reaction mass containing the cationic additive to a pH of 2. The mixture was heated for 3½ minutes at 70° C. The liquid resin thereby obtained was adjusted to a pH of about 6.5-7 with 10% aqueous NaOH solution. The liquid resin was dilutable with water as initially prepared, yielding a cloudy solution. It was more difficultly soluble in water after standing for about 24 hours. The water solubility was increased by adding a small amount of acetone to aqueous solutions of the resin in concentrations of about 3 to 30% by weight of resin solids. An aqueous solution of the resin containing about 35% by weight of resin solids had a viscosity of about 500 centipoises at 25° C.

Example 29

Same as Example 27 with the exception that there was used 12 parts of a 50% aqueous solution of the cationic additive of Example 7, and the reaction mass containing the cationic additive and the urea-formaldehyde partial reaction product was heated for 3½ minutes at 70° C. The liquid resin was adjusted to a pH of about 6.5-7 with 10% aqueous NaOH solution. It was miscible with water. An aqueous solution of the resin containing about 35% by weight of resin solids had a viscosity of about 125 centipoises at 25° C.

In Examples 8 to 29, inclusive, the liquid resins, unless otherwise stated, were adjusted to a calculated concentration of 35% by weight of resin solids if they were not of that concentration as initially prepared. These solutions were subsequently diluted to about 10% by weight of resin solids prior to testing as agents for increasing the wet strength of paper. If the liquid resin was not dilutable with water to a 10% concentration without separation of resin, sufficient acetone (usually about 5% by weight of the final solution) was added to keep the resin in solution at this concentration.

Bleached kraft paper pulp was beaten in the usual manner and made into a water suspension containing about 0.6% by weight of pulp. Portions of this pulp were then treated with each of the liquid resins of Examples 8 to 29, inclusive, diluted to a concentration of 10% by weight of resin solids. The amount of liquid resin employed in each case corresponds to 3% by weight of resin solids, based on the weight of the dry paper pulp. To the water suspension also was added 3% by weight of alum, likewise based on the weight of the dry pulp. The pH of this dilute suspension of pulp containing the resin and alum was adjusted to 4.5 by addition of hydrochloric acid or sodium hydroxide. The treated suspensions of pulp were made into hand sheets which were heated 1 minute at 220° F. to dry the paper and to cure the resin. Some of the sheets were given an additional heating of 10 minutes at 260° F. to determine the effect of a more complete cure. The sheets were then tested for dry and wet tensile strength (Schopper testing device) along with a sheet made from the same stock but containing no resin. The values shown are, in each case, the average of 10 determinations on the particular sample. In the following table, the per cent of resin retained is based on the amount of resin added.

Table

| Example No. | Strength of paper after heating for 1 minute at 220° F. in pounds per inch | | Strength of paper after further heating for 10 minutes at 260° F. in pounds per inch | | Percent of resin retained by paper |
|---|---|---|---|---|---|
| | Dry | Wet | Dry | Wet | |
| Untreated paper | 20 | less than 0.4 | | | |
| 8 | 25.2 | 4.8 | | | 34 |
| 9 | 26.4 | 4.6 | | | 35 |
| 10 | 26.0 | 4.0 | | | 22 |
| 11 | 26.2 | 4.4 | | | 34 |
| 12 | 24.0 | 4.2 | | | 25 |
| 13 | 23.8 | 4.4 | | | 35 |
| 14 | 23.2 | 4.6 | | | 39 |
| 15 | 23.6 | 4.4 | | | 40 |
| 16 | 23.4 | 4.2 | | | 44 |
| 17 | 25.2 | 5.0 | | | 35 |
| 18 | 24.2 | 5.4 | 28.0 | 8.2 | 35 |
| 19 | 24.2 | 4.4 | 25.8 | 6.4 | 29 |
| 20 | 24.6 | 4.2 | 26.2 | 7.8 | 34 |
| 21 | 25.6 | 5.4 | 26.6 | 7.8 | 36 |
| 22 | 25.0 | 5.0 | 25.4 | 8.0 | 44 |
| 23-A | 24.8 | 3.4 | 26.6 | 6.4 | 38 |
| 23-B | 24.8 | 3.8 | 24.2 | 6.4 | 42 |
| 23-C | 25.4 | 4.0 | 25.8 | 7.0 | 41 |
| 23-D | 24.2 | 4.2 | 25.8 | 6.6 | 42 |
| 23-E | 24.4 | 4.2 | 26.4 | 7.4 | 41 |
| 24 | 25.8 | 4.4 | 26.2 | 8.2 | 39 |
| 25 | 23.8 | 3.4 | 26.2 | 6.4 | 35 |
| 26 | 25.2 | 4.2 | 25.8 | 8.0 | 46 |
| 27 | 24.6 | 4.0 | 24.8 | 6.6 | 39 |
| 28 | 24.8 | 4.4 | 26.4 | 7.4 | 40 |
| 29 | 25.2 | 4.0 | 26.2 | 6.8 | 44 |

In all cases the treated sheets had a "basis weight" of from about 45 to 51 pounds. (The "basis weight" is the weight in pounds of 500 sheets, 25 x 40 inches in size.)

The color of the modified urea-formaldehyde resins of this invention is largely dependent upon the color of the cationic additive and the quantity thereof used in the preparation of the resin. Good results in the production of papers having a high wet strength and adequate resin retention were obtained when the resin employed was one wherein the formaldehyde was used in an amount within the range of about 2.0 to about 2.8, more particularly from 2.2 to 2.6, mols of formaldehyde per mol of urea. Optimum results were secured using a resin in which approximately 2.5 mols of formaldehyde per mol of urea was employed. Such a resin has good stability on storage and makes possible the production of papers having a high wet strength and other desirable characteristics.

In general, there appears to be a gradual increase in the wet strength of the treated paper when the resin employed is one in which the reaction between the cationic additive and the urea-formaldehyde partial reaction product has been caused to proceed until the resulting liquid resin containing about 35 to 40% by weight of resin solids has a viscosity of 200 centipoises at 25° C. When the resin used is one having a viscosity substantially above about 200 centipoises, e. g., 250 to 300 centipoises or more, the wet strength of a paper treated with such a more viscous liquid resin is approximately the same as that obtained using a resin having a viscosity of 200 centipoises or less. Since reaction between the cationic additive and the urea-formaldehyde partial reaction product to a point appproaching a gelation reduces the stability of the resin solution and also its solubility, a viscosity of the order of 50 to 200, preferably 100 to 200, centipoises at 25° C. is the preferred viscosity of the resins of this invention, when they are in the form of aqueous solutions containing about 35 to 40% by weight of resin solids.

The stability on storage of our liquid resins is influenced by such factors as the ratio of formaldehyde to urea used in the preparation of the resin, the extent of the reaction between the catonic additive and the urea-formaldehyde partial reaction product, and the pH of the liquid resin. The storage stability can be improved by increasing the proportion of formaldehyde above 2.5 mols of formaldehyde per mol of urea or by decreasing the extent of the reaction between the additive and the urea-formaldehyde partial reaction product to a point such that the liquid resin has a viscosity substantially below about 200 centipoises at 25° C. However, such improvements in storage stability obtained in this manner are secured only at the sacrifice of wet strength in the treated paper. Within rather broad limits the pH of the liquid resin appears to have no great effect on the wet strength of the paper treated therewith. For example, the pH of the resin may vary from 5.0 to 8.5, but preferably is adjusted to a pH within the range of 6.75 to 7.25 in order to provide a product which has optimum stability on storage.

The resinous compositions of this invention are particularly suitable for use in the treatment of cellulosic fibrous materials, e. g., paper, to improve the wet strength of the paper. However, they also may be employed for various other purposes in, for instance, the plastics and coating arts, e. g., as coating, impregnating and laminating compositions, or as components of such compositions, which are used in the production of coated, impregnated and laminated articles. They also may be employed as adhesives or as components of adhesives. For instance, they may be used for anchoring water-proof coatings on sheet materials, more particularly cellulosic materials, e. g., cellophane; and for bonding together wood laminae to form a plywood.

We claim:

1. A resinous composition comprising a urea-formaldehyde resin chemically combined under heat with a water-soluble product of reaction under heat of (1) dicyandiamide with (2) the water-soluble product of reaction, under heat and acid conditions and in the presence of a liquid medium comprising water, of formaldehyde and an amine selected from the class consisting of primary aromatic hydrocarbon monoamines and secondary hydrocarbon monoamines having at least one aryl radical attached directly to the amine nitrogen atom, each aryl radical of the said primary and secondary monoamines having at least two of its ortho and para positions unsubstituted, the formaldehyde and the amine being employed in the ratio of from about 0.5 to about 1.5 mols of formaldehyde per mol of the amine, and the dicyandiamide of (1) being employed in an amount corresponding to at least about 0.9 mol thereof per mol of the amine used in forming the reaction product of (2).

2. A heat-curable resinous composition comprising a thermosetting resinous chemical combination resulting from heating a mixture of (1) a product of partial reaction under non-acidic conditions between urea and formaldehyde and (2) a water-soluble product of reaction, under heat and acid conditions and in the presence of a liquid medium comprising water, of (a) dicyandiamide with (b) the water-soluble product of reaction, under heat and acid conditions and in the presence of a liquid medium comprising water, of formaldehyde and an amine selected from the class consisting of primary aromatic hydrocarbon monoamines and secondary hydrocarbon monoamines having at least one aryl radical attached directly to the amine nitrogen atom, each aryl radical of the said primary and secondary monoamines having at least two of its ortho and para positions unsubstituted, the formaldehyde and the amine being employed in the ratio of from about 0.5 to about 1.5 mols of formaldehyde per mol of the amine, the dicyandiamide of (a) being employed in an amount corresponding to at least about 0.9 mol thereof for each mol of the amine used in forming the reaction product of (b), and the water-soluble reaction product of (2) being employed in an amount corresponding to from 2 to 30% by weight of the urea used in forming the partial reaction product of (1).

3. A product comprising the cured resinous composition of claim 2.

4. A liquid, heat-curable, cationic resin comprising a solution of a thermosetting resin obtained by effecting reaction under heat and acid conditions between (1) a product of partial reaction under alkaline conditions between urea and formaldehyde and (2) a water-soluble product of reaction, under heat and acid conditions and while in intimate contact with a liquid medium comprising water, of (a) dicyandiamide with (b) the water-soluble product of reaction, under heat and acid conditions and while in intimate contact with a liquid medium comprising water, of formaldehyde and a primary aromatic hydrocarbon monoamine having an aryl radical attached directly to the amine nitrogen atom, said aryl radical having at least two of its ortho and para positions unsubstituted and the said reactants being employed in the ratio of from 0.6 to 1.3 mols of formaldehyde per mol of the said amine, the dicyandiamide of (a) being employed in an amount corresponding to from about 1 to about 1.3 mols thereof for each mol of the amine used in forming the reaction product of (b), and the water-soluble reaction product of (2) being employed in an amount corresponding to from 6 to 15% by weight of the urea used in forming the partial reaction product of (1).

5. A liquid, heat-curable, cationic resin comprising a solution of a thermosetting resin obtained by effecting reaction under heat and acid conditions between (1) a product of partial reaction under alkaline conditions between urea and formaldehyde and (2) a water-soluble product of reaction, under heat and acid conditions and while in intimate contact with a liquid medium comprising water, of (a) dicyandiamide with (b) the water-soluble product of reaction, under heat and acid conditions and while in intimate contact with a liquid medium comprising water, of formaldehyde and an N-lower alkyl aniline in the ratio of from 0.6 to 1.3 mols of formaldehyde per mol of the said N-lower alkyl aniline, the dicyandiamide of (a) being employed in an amount corresponding to from about 1 to about 1.3 mols thereof for each mol of the N-lower alkyl aniline used in forming the reaction product of (b), and the water-soluble reaction product of (2) being employed in an amount corresponding to from 6 to 15% by weight of the urea used in forming the partial reaction product of (1).

6. A liquid, thermosetting, resinous composition comprising a solution of a water-soluble, heat-curable, cationic urea-formaldehyde resin chemically combined under heat with a water-soluble product of reaction, under heat and acid conditions and in an aqueous medium, of (1)

dicyandiamide with (2) the water-soluble product of reaction, under heat and acid conditions and in an aqueous medium, of formaldehyde and aniline in the ratio of from about 0.5 to about 1.5 mols of formaldehyde per mol of aniline, the dicyandiamide of (1) being employed in an amount corresponding to at least about 0.9 mol thereof for each mol of aniline used in forming the reaction product of (2), and the said water-soluble product of reaction (1) and (2) being employed in an amount corresponding to from 2 to 30% by weight of the urea used in the said urea-formaldehyde resin.

7. A liquid, thermosetting, resinous composition comprising a solution of a water-soluble, heat-curable, cationic urea-formaldehyde resin chemically combined under heat with a water-soluble product of reaction, under heat and acid conditions and in an aqueous medium, of (1) dicyandiamide with (2) the water-soluble product of reaction, under heat and acid conditions and in an aqueous medium, of formaldehyde and N-methylaniline in the ratio of from about 0.5 to about 1.5 mols of formaldehyde per mol of N-methylaniline, the dicyandiamide of (1) being employed in an amount corresponding to at least about 0.9 mol thereof for each mol of N-methylaniline used in forming the reaction product of (2), and the said water-soluble product of reaction of (1) and (2) being employed in an amount corresponding to from 2 to 30% by weight of the urea used in the said urea-formaldehyde resin.

8. A liquid, cationic, hydrophilic, thermosetting, resinous composition comprising an aqueous solution of a water-soluble, heat-curable resin obtained by effecting reaction under acid conditions between (1) a product of partial reaction under non-acidic conditions between urea and an aqueous solution of formaldehyde in the ratio of from about 2.0 to about 2.8 mols of formaldehyde per mol of urea and (2) a water-soluble product of reaction, under heat and acid conditions and in an aqueous medium, of (a) dicyandiamide with (b) the water-soluble product of reaction under heat, at a pH not substantially exceeding about 3, of an aqueous solution of formaldehyde and aniline in the ratio of from 0.6 to 1.3 mols of formaldehyde per mol of aniline, the dicyandiamide of (a) being employed in an amount corresponding to from about 1 to about 1.3 mols thereof for each mol of aniline used in forming the reaction product of (b), and the water-soluble reaction product of (2) being employed in an amount corresponding to from 6 to 15% by weight of the urea used in forming the partial reaction product of (1).

9. A liquid, cationic, hydrophilic, thermosetting, resinous composition comprising an aqueous solution of a water-soluble, heat-curable resin obtained by effecting reaction under acid conditions between (1) a product of partial reaction under non-acidic conditions between urea and an aqueous solution of formaldehyde in the ratio of from about 2.0 to about 2.8 mols of formaldehyde per mol of urea and (2) a water-soluble product of reaction, under heat and acid conditions and in an aqueous medium, of (a) dicyandiamide with (b) the water-soluble product of reaction under heat, at a pH not substantially exceeding about 3, of an aqueous solution of formaldehyde and N-methylaniline in the ratio of from 0.6 to 1.3 mols of formaldehyde per mol of N-methylaniline, the dicyandiamide of (a) being employed in an amount corresponding to from about 1 to about 1.3 mols thereof for each mol of N-methylaniline used in forming the reaction product of (b), and the water-soluble reaction product of (2) being employed in an amount corresponding to from 6 to 15% by weight of the urea used in forming the partial reaction product of (1).

10. An aqueous, cationic, resinous composition which is especially adapted for treating the fibers of paper to increase the wet-strength characteristics of the paper and which is convertible under heat to a water-insoluble condition, said composition comprising an aqueous solution of a water-soluble, thermosetting resin obtained by effecting reaction, under heat and acid conditions and in an aqueous medium between (1) a product of partial reaction under alkaline conditions between urea and an aqueous solution of formaldehyde in the ratio of from 2.2 to 2.6 mols of formaldehyde per mol of urea and (2) a water-soluble product of reaction, under heat and acid conditions and in an aqueous medium, of (a) dicyandiamide with (b) the water-soluble product of reaction under heat, at a pH of less than 2, of aniline and an aqueous solution of formaldehyde in the ratio of from 0.6 to 1.3 mols of formaldehyde per mol of aniline, the dicyandiamide of (a) being employed in an amount corresponding to from about 1 to about 1.3 mols thereof per mol of aniline used in forming the reaction product of (b), the water-soluble reaction product of (2) being employed in an amount corresponding to from 6 to 15% by weight of the urea used in forming the partial reaction product of (1), and the said water-soluble thermosetting resin being so advanced in cure that a 35–40%, by weight, aqueous solution thereof has a viscosity at 25° C. of at least 100 centipoises.

11. The method of preparing a resinous composition which comprises effecting reaction under heat between (1) a partial reaction product of urea and formaldehyde and (2) a water-soluble product of reaction under heat of (a) dicyandiamide with (b) the water-soluble product of reaction, under heat and acid conditions and in the presence of a liquid medium comprising water, of formaldehyde and an amine selected from the class consisting of primary aromatic hydrocarbon monoamines and secondary hydrocarbon monoamines having at least one aryl radical attached directly to the amine nitrogen atom, each aryl radical of the said primary and secondary monoamines having at least two of its ortho and para positions unsubstituted, the formaldehyde and the amine being employed in the ratio of from about 0.5 to about 1.5 mols of formaldehyde per mol of the said amine, and the dicyandiamide of (a) being employed in an amount corresponding to at least about 0.9 mol thereof per mol of the amine used in forming the reaction product of (b).

12. The method of preparing a resinous composition which comprises effecting reaction under heat and acid conditions between (1) a product of partial reaction under non-acidic conditions between urea and formaldehyde and (2) a water-soluble product of reaction, under heat and acid conditions and while in intimate contact with a liquid medium comprising water, of (a) dicyandiamide with (b) the water-soluble product of reaction, under heat and acid conditions and while in intimate contact with a liquid medium comprising water, of formaldehyde and a primary aromatic hydrocarbon monoamine having an aryl radical attached directly to the amine nitrogen atom, said aryl radical having at least two of its ortho and para positions unsubstituted and the said reactants being employed in the ratio of from about 0.5 to about 1.5 mols of formaldehyde per mol of the said monoamine, the dicyandiamide of (a) being employed in an amount corresponding to at least about 0.9 mol thereof for each mol of the amine used in forming the reaction product of (b), and the water-soluble reaction product of (2) being employed in an amount corresponding to from 2 to 30% by weight of the urea used in forming the partial reaction product of (1).

13. The method of preparing a resinous composition which comprises effecting reaction, under heat and acid conditions and in an aqueous medium, between (1) a product of partial reaction under non-acidic conditions between urea and formaldehyde and (2) a water-soluble product of reaction, under heat and acid conditions and in an aqueous medium, of (a) dicyandiamide with (b) the water-soluble product of reaction; under heat and acid conditions and in an aqueous medium, of formaldehyde and a secondary hydrocarbon monoamine having at least one aryl radical in which at least two of its ortho and para positions are unsubstituted attached directly to the amine nitrogen atom, the said reactants being employed in the ratio of from about 0.5 to about 1.5 mols of formaldehyde per mol of the said monoamine, the dicyandiamide of (a) being employed in an amount corresponding to at least about 0.9 mol thereof for each mol of the amine used in forming the reaction product of (b), and the water-soluble reaction product of (2) being employed in an amount corresponding to from 2 to 30% by weight of the urea used in forming the partial reaction product of (1).

14. The method of preparing a liquid, heat-curable, cationic, resinous composition which comprises effecting reaction, under heat and acid conditions and in an aqueous medium, between (1) a product of partial reaction under alkaline conditions between urea and an aqueous solution of formaldehyde and (2) a water-soluble product of reaction, under heat and acid conditions, of (a) dicyandiamide with (b) the water-soluble product of reaction under heat, at a pH not substantially exceeding about 3, of aniline and an aqueous solution of formaldehyde in the ratio of from 0.6 to 1.3 mols of formaldehyde per mol of aniline, the dicyandiamide of (a) being employed in an amount corresponding to from about 1 to about 1.3 mols thereof per mol of aniline used in forming the reaction product of (b), and the water-soluble reaction product of (2) being employed in an amount corresponding to from 6 to 15% by weight of the urea used in forming the partial reaction product of (1).

15. The method of preparing a liquid, heat-curable, cationic, resinous composition which comprises effecting reaction, under heat and acid conditions and in an aqueous medium, between (1) a product of partial reaction under alkaline conditions between urea and an aqueous solution of formaldehyde and (2) a water-soluble product of reaction, under heat and acid conditions, of (a) dicyandiamide with (b) the water-soluble product of reaction under heat, at a pH not substantially exceeding about 3, of N-methylaniline and an aqueous solution of formaldehyde in the ratio of from 0.6 to 1.3 mols of formaldehyde per mol of N-methylaniline, the dicyandiamide of (a) being employed in an amount corresponding to from about 1 to about 1.3 mols thereof per mol of N-methylaniline used in forming the reaction product of (b), and the water-soluble reaction product of (2) being employed in an amount corresponding to from 6 to 15% by weight of the urea used in forming the partial reaction product of (1).

16. The method of preparing an aqueous, heat-curable, cationic, resinous composition which comprises effecting reaction, under heat and acid conditions and in an aqueous medium, between (1) a product of partial reaction under alkaline conditions between urea and an aqueous solution of formaldehyde in the ratio of from about 2.0 to about 2.8 mols of formaldehyde per mol of urea and (2) a water-soluble product of reaction, under heat and acid conditions, of (a) dicyandiamide with (b) the water-soluble product of reaction under heat of aniline and an aqueous solution of formaldehyde while admixed with hydrochloric acid in an amount sufficient to impart to the reaction mass a pH of less than 2, the aniline and formaldehyde reactants of (b) being employed in the ratio of from 0.6 to 1.3 mols of formaldehyde per mol of aniline, the dicyandiamide of (a) being in an amount corresponding to from about 1 to about 1.3 mols thereof per mol of aniline used in forming the reaction product of (b), the water-soluble reaction product of (2) being employed in an amount corresponding to from 6 to 15% by weight of the urea used in forming the partial reaction product of (1), and the reaction between the reactants of (1) and (2) being continued until the water-soluble thermosetting resin thereby produced has so advanced in cure that a 35–40%, by weight, aqueous solution thereof has a viscosity at 25° C. of at least 100 centipoises.

17. An aqueous, cationic thermosetting resinous composition comprising an aqueous solution of a water-soluble, heat-curable resin obtained by effecting reaction, under heat and acid conditions and in an aqueous medium, between (1) an alkaline-catalyzed urea-formaldehyde product of partial reaction under heat of urea and an aqueous solution of formaldehyde in the ratio of from 2.0 to 2.6 mols of formaldehyde per mol of urea and (2) a water-soluble product of reaction, under heat and acid conditions and in an aqueous medium, of (a) dicyandiamide and (b) the water-soluble product of reaction under heat, at a pH of not more than 3, of aniline and an aqueous solution of formaldehyde in the ratio of from 0.7 to 1.2 mols of formaldehyde per mol of aniline, the dicyandiamide of (a) being employed in an amount corresponding to from 1 to 1.15 mols thereof per mol of aniline used in forming the reaction product of (b), and the water-soluble reaction product of (2) being employed in an amount corresponding to from 6 to 15% by weight of the urea used in forming the partial reaction product of (1).

JAMES R. DUDLEY.
JOHN A. ANTHES.

REFERENCES CITED

The following references are of record in the file of this patent:

UNITED STATES PATENTS

| Number | Name | Date |
|---|---|---|
| 2,013,589 | Sutter et al. | Sept. 3, 1935 |
| 2,228,514 | Griessbach et al. | Jan. 14, 1941 |

Certificate of Correction

Patent No. 2,497,074                                                            February 14, 1950

JAMES R. DUDLEY ET AL.

It is hereby certified that errors appear in the printed specification of the above numbered patent requiring correction as follows:

Column 3, line 38, for the word "power" read *paper*; column 5, line 68, for "usual" read *usually*; column 6, lines 17 and 18, for "accruses" read *accrues*; line 41, for "dicyandiamine" read *dicyandiamide*; column 7, line 12, after "If" strike out the comma; same column, line 52, and column 8, line 59, in each table, first column thereof, for "Analine" read *Aniline*; column 17, line 55, for "corresponds" read *corresponded*; column 18, line 68, strike out "a", second occurrence; column 21, line 10, after "reaction" insert *of*; lines 37 and 38, for "reaction under acid conditions between" read *reaction, under heat and acid conditions and in an aqueous medium, between*; line 61, for "reaction under acid" read *reaction, under heat and acid*; line 62, after the syllable "tions" insert *and in an aqueous medium,*; column 22, line 16, after "medium" insert a comma; column 24, line 27, after "being" insert *employed*;

and that the said Letters Patent should be read with these corrections therein that the same may conform to the record of the case in the Patent Office.

Signed and sealed this 13th day of June, A. D. 1950.

[SEAL]

THOMAS F. MURPHY,
                                           *Assistant Commissioner of Patents.*